(12) United States Patent
Lai

(10) Patent No.: US 6,718,611 B1
(45) Date of Patent: Apr. 13, 2004

(54) METHOD OF MANUFACTURING PERFORATED METAL COVER

(75) Inventor: Wente Lai, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/334,949

(22) Filed: Dec. 31, 2002

(30) Foreign Application Priority Data

Dec. 4, 2002 (TW) .......................................... 91135119

(51) Int. Cl.⁷ ................................................ B23P 17/00
(52) U.S. Cl. ............................. 29/412; 29/415; 29/418; 29/424; 72/38; 451/54; 451/66; 451/113
(58) Field of Search ......................... 29/412, 415, 418, 29/596, 424, 429, 430, 526.4, 557, 432; 312/223.4; 72/38; 451/54, 66, 113; 198/341.03, 341.08, 339.1

(56) References Cited

U.S. PATENT DOCUMENTS

| | | | | |
|---|---|---|---|---|
| 5,918,359 A | * | 7/1999 | Neuenschwander | ........ 29/564.2 |
| 6,015,334 A | * | 1/2000 | Hundeøl | ...................... 451/28 |
| 6,113,247 A | * | 9/2000 | Adams et al. | .............. 362/237 |
| 2003/0062811 A1 | * | 4/2003 | Peker et al. | ............. 312/223.1 |
| 2003/0127338 A1 | * | 7/2003 | Beier-Korbmacher et al. | ... 205/229 |

* cited by examiner

Primary Examiner—Peter Vo
Assistant Examiner—Stephen Kenny
(74) Attorney, Agent, or Firm—Wei Te Chung

(57) ABSTRACT

A method of manufacturing a perforated metal cover (1) includes steps of: step (60), successively punching holes in a piece of metal sheet at a plurality of workstations and cutting the metal sheet into a plurality of metal bases; step (62), stamping the metal bases into three dimensions; step (64), grinding the metal bases; and step (66), anodizing the metal bases to produce the finished covers. Each workstation includes at least one punch, and each punch includes a die having a plurality of punch heads, which number and arrangement are predetermined according to the holes (3) to be formed in the perforated cover. Different arrays of holes are punched in the metal sheet in different punches.

14 Claims, 2 Drawing Sheets

METHOD OF MANUFACTURING PERFORATED METAL COVER

FIELD OF THE INVENTION

The present invention relates to a method of manufacturing a perforated cover for an electronic device.

BACKGROUND OF THE INVENTION

Due to their characteristics of heat resistance, wear resistance, high luster, and other decorative qualities, metal materials are widely used to manufacture covers of electronic devices, such as covers of mobile phones, personal digital assistants, or portable computers. In recent years, many methods have been developed to improve the appearance and ease of manufacturing of device covers. For instance, coloring the surfaces of the covers or painting them has been tried. If a perforated structure can be formed in the covers, the appearance may be improved, and the structure will be advantageous for heat dissipation. Conventional methods for manufacturing a perforated cover mainly involve repeatedly drilling holes in the cover using a drill. However the drilling process is manual, so is too time-consuming and is not suitable for mass production. In addition, it is also difficult to precisely position the holes in the cover, and the holes can present a poor appearance due to burrs, stuffed holes, or wrongly positioned holes.

Therefore, an improved method of manufacturing a perforated metal cover that overcomes the above-mentioned disadvantages is desired.

SUMMARY OF THE INVENTION

A main object of the present invention is to provide a simple method of mass-producing a perforated metal cover for an electronic device.

Another object of the present invention is to provide a method of manufacturing a perforated metal cover which result in a brilliant appearance.

To achieve the above objects, a method of manufacturing perforated covers comprise steps of: successively punching holes in a piece of metal sheet at a plurality of workstations and cutting the metal sheet into a plurality of bases; stamping the metal bases into three dimensions; grinding the metal bases and anodizing the metal bases, thus producing a finished metal cover from each metal base. Each workstation includes at least a punch, each punch includes at least one pair of punching dies, and each top punching die includes a plurality of punch heads, which number and arrangement are predetermined according to a pattern of the holes to be formed in the cover. Different arrays of holes are formed in the metal sheet in different punches.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 1:
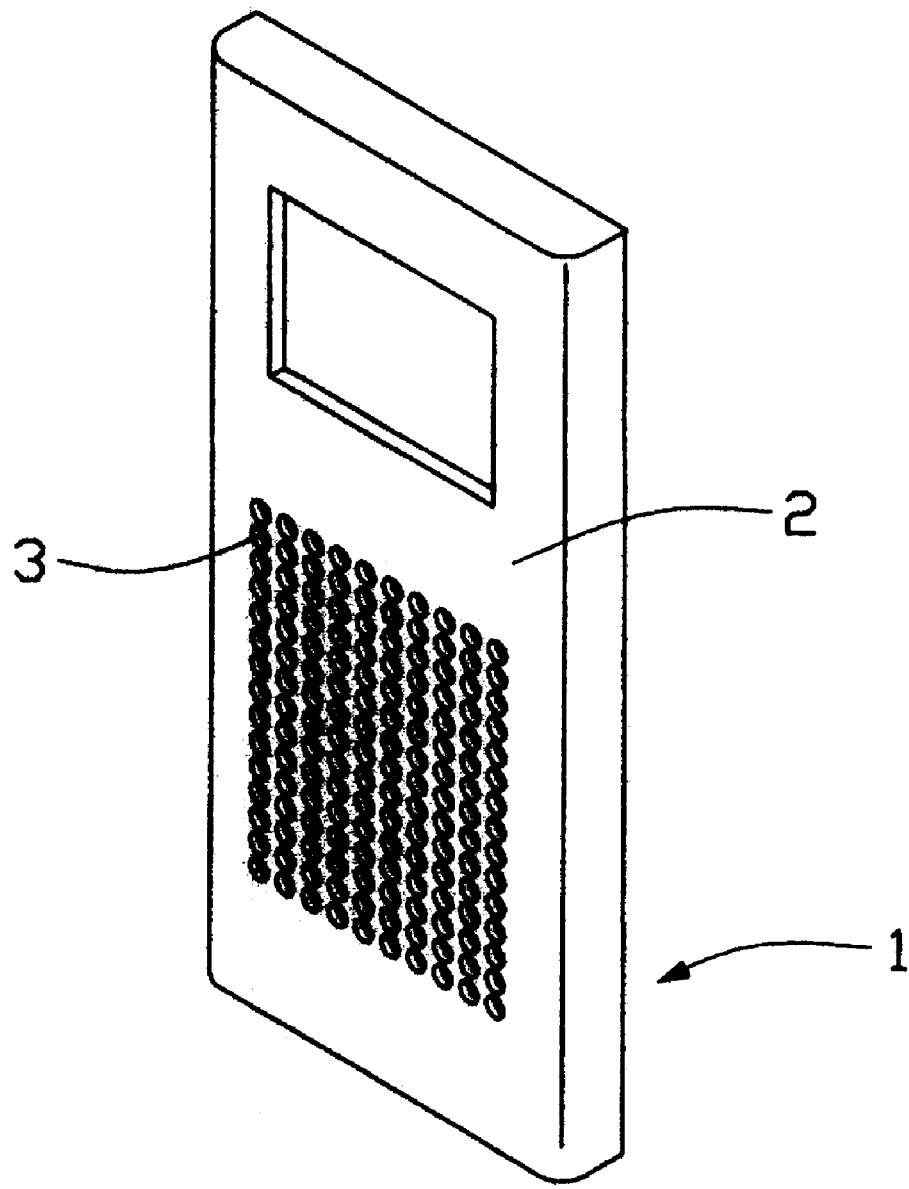
FIG. 1 is a perspective view of a perforated metal device cover manufactured according to a method of the present invention.
Figure 2:
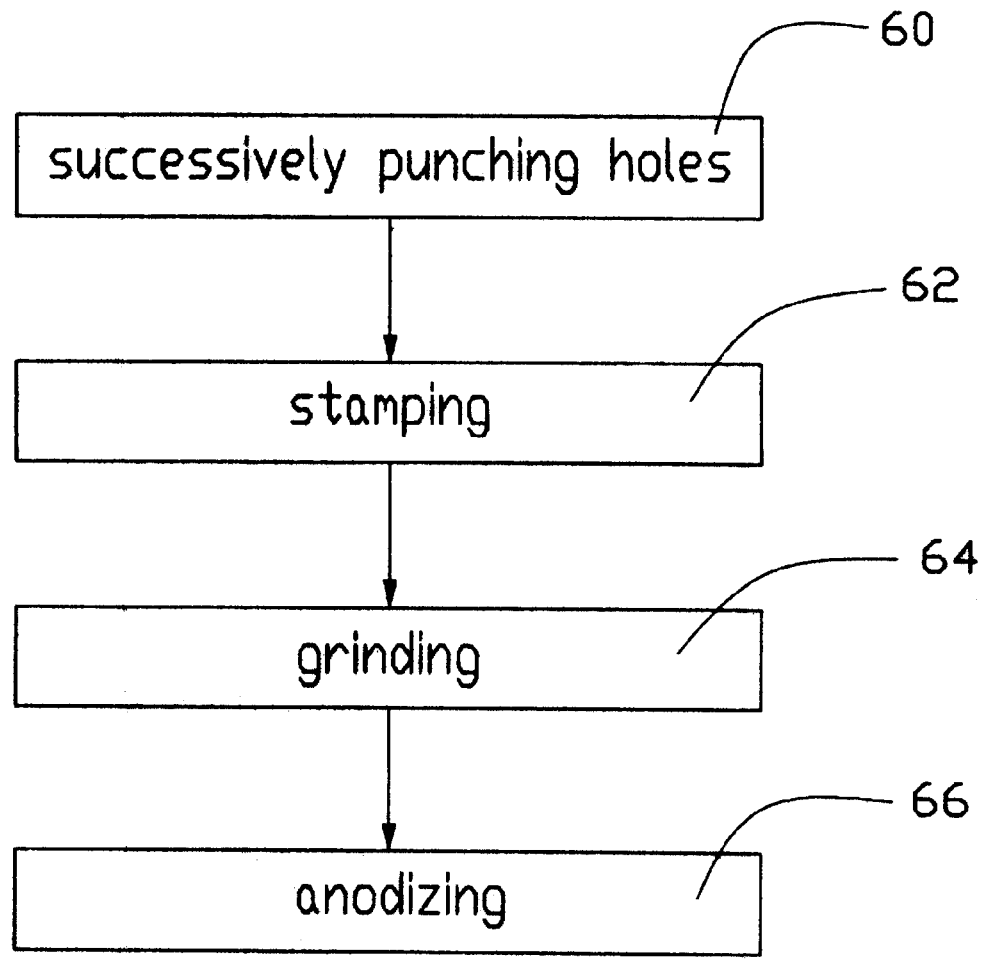
FIG. 2 is a flow chart of a process of manufacturing the perforated metal cover of FIG. 1 according to a preferred embodiment of the present invention.

Referring now to the drawings in detail, FIG. 1 shows a perforated metal cover 1 for a mobile phone. The perforated metal cover 1 includes a metal shell 2. A plurality of holes 3 are formed in the metal shell 2. The holes 3 are punched in a geometric pattern. The perforated metal cover 1 has an anodized surface, and can be colored. Referring to FIG. 2, a method of forming the perforated metal cover 1 of FIG. 1 comprises the steps of: step 60, successively punching holes; step 62, stamping; step 64, grinding; and step 66, anodizing.

In step 60, a piece of metal sheet is successively punched at a plurality of workstations. In the method of the preferred embodiment of the present invention, there are 4 to 10 workstations. Each workstation includes at least one punch, each punch includes at least one pair of punching dies which consist of a top punching die and a bottom punching die, and the top punching die has a plurality of punch heads, which number and arrangement are predetermined according to a pattern of the holes 3 to be formed in the cover 1. The space between every two adjacent punch heads in the same die is not less than 3 millimeters away. The metal sheet is mounted on a conveyer belt and is carried stepwise into the workstations to punch holes. The conveyer belt has a guiding device on its sides and a feeding device at one end of the conveyer belt, so the metal sheet can be carried from one workstation to another workstation. At each workstation, the metal sheet is put into a punch, fastened to the punch using pins or bolts, the holes in an array of holes in the metal sheet are all punched at one time, then the metal sheet is unfastened from the punch and sent to the next workstation for another punch. Different arrays of holes are formed in the metal sheet in different punches. After all punches finished at all the workstations, a plurality of hole arrays, each formed in a predetermined geometric pattern, are formed in the metal sheet. The metal sheet is then cut into a plurality of metal bases according to a contour of the perforated metal cover 1.

In step 62, the metal bases are stamped into three dimensions.

After step 60 and step 62, the metal bases and the holes therein have burrs, some holes are stuffed, and the surfaces of the metal bases are rough. So the next step, step 64, grinding the metal bases, is necessary and important. The grinding process can be performed in a vibratory finishing machine, in which ceramic grindstones used as a finishing media, detergent, and brightener are added and mixed for grinding. The grinding process is carried out for a predetermined time, until the metal bases exhibit smooth and brilliant surfaces. Other grinding processes can be used in place of the above to grind the metal bases.

In step 66, the metal bases are first subjected to degreasing, washing, drying or other conventional pretreatments, such as chemical or mechanical polishing, if necessary. Then, the metal bases are dipped into an electrolytic cell containing a sulfuric acid solution, and a direct current power is applied to the electrolytic cell. During the anodizing process, a concentration of the sulfuric acid in the electrolytic cell is in a range of 100 to 220 g/L, a voltage of the direct current power applied to the electrolytic cell is between 8 and 18V, and a current density of the direct current power is between 100.0 and 200.0 A/m$^2$. The anodization is carried out at a temperature between 15 and 25 degrees Centigrade for 30 to 60 minutes, during which an anodic oxide film is formed on the surface of each metal base. The thickness of the anodic oxide film is in a range of 8 to 15 μm. After being anodized, the metal bases are washed, dried, and then colored, if necessary. The coloring methods can be electrolytic coloring, integral coloring, or dye coloring. The dye coloring method is described in more detail below. The metal bases are soaked in a dyeing bath containing organic dyes to color the anodic oxide film. A concentration of the organic dyes is between 1 and 10 g/L. The dyeing process is performed for 5 to 20 minutes. The organic dyes comprise aluminum red GLW and aluminum violet CLW, so that the color of the anodized surfaces of the metal bases are red. Other dyes can be used to get other desired colors on the anodized surfaces of the metal bases. After the coloring process, the anodized metal bases are sealed in boiling water about 30 minutes, and are then washed and dried. A plurality of finished, perforated covers 1 as shown in FIG. 1 are obtained.

In this embodiment, the punch heads are preferably circular to form circular holes 3 in the cover 1. Rectangular, triangular, elliptic or other specially shaped punch heads can also be used to form differently shaped holes 3. Variously shaped punch heads can also be combined in each punching die to form variously shaped holes 3 in the cover 1.

It is understood that the invention may be embodied in other forms without departing from the spirit thereof. Thus, the present examples and embodiment are to be considered in all respects as illustrative and not restrictive, and the invention is not to be limited to the details given herein.

What is claimed is:

1. A method of manufacturing a perforated metal cover comprising steps of:
   successively punching holes in a piece of metal sheet at a plurality of workstations, and cutting the metal sheet into a plurality of metal bases;
   stamping the bases into three dimensions;
   grinding the bases using a vibratory finishing process during said vibratory finishing process, ceramic grindstones used as a finishing media, detergent, and brightener are added and mixed for said grinding; and
   anodizing the bases;
   wherein, in the step of successively punching holes, each workstation includes at least one punch, each punch includes at least one pair of punching dies, one of said punching dies includes a plurality of punch heads, said punch head number and arrangement are predetermined according to a pattern of the holes to be formed in the perforated cover.

2. The method as claimed in claim 1, wherein the punch heads are circular, rectangular, triangular, elliptic to form circular, rectangular, triangular, elliptic shaped holes in the metal sheet.

3. The method as claimed in claim 1, wherein the punch heads are variously shaped punch heads combined in each punching die to form differently shaped holes in the metal sheet.

4. The method as claimed in claim 1, wherein there are 4 to 10 workstations.

5. The method as claimed in claim 1, wherein the metal sheet is mounted on a conveyer belt and is carried stepwise from one workstation to another workstation to punch holes.

6. The method as claimed in claim 5, wherein the conveyer belt has a guiding device on its sides and a feeding device at one end of the conveyer belt.

7. The method as claimed in claim 6, wherein different arrays of holes are punched in the metal sheet in different punches, after all punches are finished, the metal sheet is cut into metal bases according to a contour of the perforated cover.

8. The method as claimed in claim 1, wherein the anodizing process is carried out in an electrolytic cell containing a sulfuric acid solution.

9. The method as claimed in claim 8, wherein a concentration of the sulfuric acid is in a range of 100 to 220 g/L, a voltage of the direct current power applied to the electrolytic cell is between 8 and 18V, and a current density of the direct current power is between 100.0 and 200.0 A/m$^2$.

10. The method as claimed in claim 9, wherein, after anodizing, a coloring process is used, said coloring process being electrolytic coloring, integral coloring, or dye coloring.

11. A method of manufacturing a perforated metal cover comprising steps of:
    successively punching holes in a piece of metal sheet at a plurality of workstations;
    stamping;
    grinding using a vibratory finishing process, during said vibratory finishing process ceramic grindstones used as a finishing media, detergent, and brightener are added and mixed for said grinding; and
    anodizing;
    wherein, in the step of successively punching holes, the metal sheet is mounted on a conveyer belt and is carried stepwise from workstation to workstation to punch holes, each workstation includes a plurality of punch heads, which number and arrangement are predetermined according to a pattern of the holes to be formed in the perforated metal cover, and different arrays of holes are punched in the metal sheet in different punches, wherein the step of grinding uses a vibratory finishing process, during which ceramic grindstones used as a finishing media, detergent, and brightener are added and mixed for grinding.

12. The method as claimed in claim 11, wherein the punch heads are circular, rectangular, triangular, elliptic, and variously shaped punch heads can be combined to form differently shaped holes.

13. The method as, claimed in claim 11, wherein, after anodizing, a coloring process is used, said coloring process being electrolytic coloring, integral coloring, or dye coloring.

14. A method of making a perforated metal cover comprising steps of:
    providing a large metal sheet;
    successive punching holes in said metal sheet;
    cutting said perforated metal sheet into a plurality of pieces complying with a dimension of the designated metal cover and having designated holes therein;
    stamping of forming each of said pieces to a final shape of the metal cover; and
    grinding and anodizing said metal cover;
    the grinding step using a vibratory finishing process, during and vibrating and ceramic, finishing grindstones used as a finishing media, detergent, and brightener are added and mixed for grinding.

* * * * *